United States Patent [19]

Ugaji et al.

[11] 4,281,223
[45] Jul. 28, 1981

[54] ELECTRO-ACOUSTIC TRANSDUCER

[75] Inventors: Masana Ugaji, Tokyo; Hideo Suyama, Yokohama; Sadaaki Sakurai, Tokohama; Shigenori Yamaoka, Yokohama; Toshinaga Endo, Yokohama; Akinobu Kusuhara, Yokohama, all of Japan

[73] Assignee: Sony Corporation, Tokyo, Japan

[21] Appl. No.: 66,381

[22] Filed: Aug. 14, 1979

[30] Foreign Application Priority Data

Aug. 18, 1978 [JP] Japan .................................. 53-100532

[51] Int. Cl.$^3$ ........................ G10K 13/00; H04R 7/00
[52] U.S. Cl. ........................... 179/115 R; 179/181 R; 181/167; 181/170
[58] Field of Search ........ 179/115 R, 115 V, 115.5 R, 179/115.5 ES, 115.5 PV, 181 R, 181 F, 181 W; 181/167, 170; 428/424

[56] References Cited

U.S. PATENT DOCUMENTS

| 3,674,109 | 7/1972 | Murase | 181/170 |
|---|---|---|---|
| 4,086,449 | 4/1978 | Takano | 179/181 R |
| 4,140,203 | 2/1979 | Niguchi et al. | 181/167 |
| 4,190,746 | 2/1980 | Harwood et al. | 179/115.5 ES |

FOREIGN PATENT DOCUMENTS

52-4228  1/1977  Japan .................................. 179/115 R

*Primary Examiner*—Thomas A. Robinson
*Attorney, Agent, or Firm*—Lewis H. Eslinger; Alvin Sinderbrand

[57] ABSTRACT

An electro-acoustic transducer, such as a loudspeaker, a microphone, or the like, comprises a magnetic circuit having at least one air gap, a current conductor disposed in the air gap of the magnetic circuit to form a voice coil which is traversed by magnetic flux, and a vibratory structure mechanically coupled to the voice coil. The vibratory structure is comprised of a heat resistant film containing an epoxide-modified resin in which a heterocyclic compound containing a polyimide group is the main component. The voice coil is non-adhesively secured to the vibratory structure. For example, the voice coil is formed of a conductive substrate onto which the vibratory structure is coated and from which portions have been etched to form a generally spiral-shaped conductor. In one embodiment, the vibratory structure is a diaphragm; and in another embodiment, the vibratory structure is a bobbin having the voice coil wound thereon.

19 Claims, 7 Drawing Figures

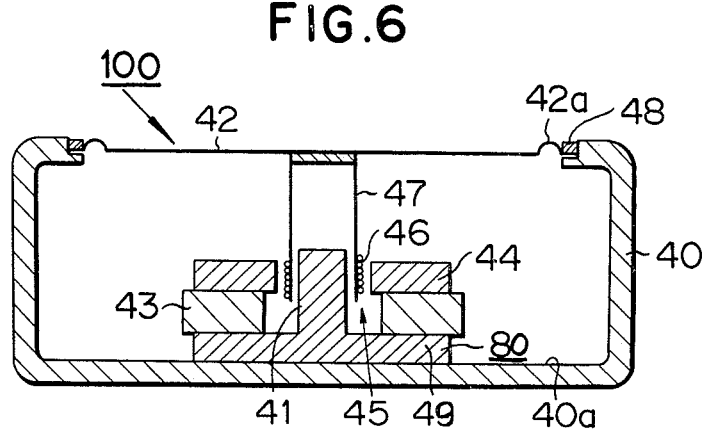
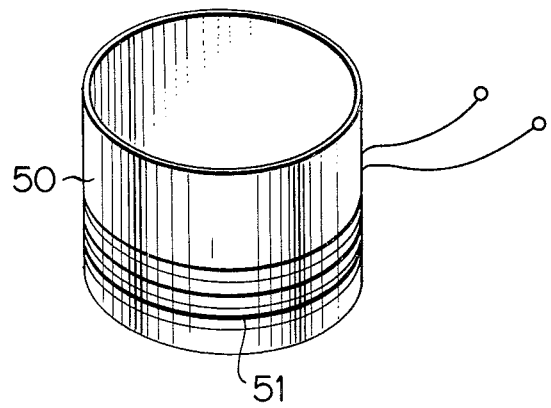

4,281,223

ELECTRO-ACOUSTIC TRANSDUCER

BACKGROUND OF THE INVENTION

This invention relates to an electro-acoustic transducer and, more particularly, to such a transducer that is provided with a novel vibratory structure.

In a typical electro-acoustic transducer, a vibratory structure is coupled to an electromagnetic coil disposed in magnetic flux such that, if current is supplied to the coil so as to impart motion thereto, the vibratory structure likewise moves to generate sound waves. This, of course, is the basic construction of a loudspeaker, headphones or other electrical-to-sound converter. Alternatively, if the vibratory structure is subjected to a mechanical force, such as by sound waves impingent thereon, the movement of the vibratory structure is transferred to movement of the electromagnetic coil, whereupon currents are induced in the coil which is moving in the presence of magnetic flux. This type of transducer is typical of a microphone.

Generally, in electro-acoustic transducers of the aforementioned type, the vibratory structure is a membrane, a diaphragm, a bobbin, or the like, and should be constructed of materials having a high Young's modulus (E) and a low resonant sharpness, or quality factor (Q) for desirable acoustic characteristics. Furthermore, such vibratory structures should be light weight. If the vibratory structure is formed of material having a high Young's modulus, the structure is more rigid and, therefore, when it is driven, results in a high fidelity conversion of electrical energy to sound or mechanical energy to an electrical signal. Furthermore, if this material exhibits a relatively low quality factor Q, peaks or valleys in its frequency characteristic, which are associated with higher quality factors, are avoided. That is, with a high quality factor Q, the vibratory structure undergoes abnormal vibrations when the driving force supplied thereto coincides with, or is in the region of, its resonant frequency. Such abnormal vibrations result in the aforementioned peaks or valleys in the frequency characteristic. With a low quality factor, such abnormal vibrations are avoided. The vibratory structure preferably should be light weight so as to minimize its inertia. That is, a relatively heavy vibratory structure used in, for example, a loudspeaker, cannot follow accurately an input driving force, particularly at middle and higher frequencies. This means that, in such a loudspeaker, the sound reproducing characteristics thereof are degraded, particularly in the medium and high range regions. A similar disadvantage also is applicable to a relatively heavy vibratory structure used in a microphone.

Another difficulty encountered with electro-acoustic transducers relates to the high operating temperatures of the voice coil, that is, the current conductor which is disposed in the magnetic flux, when the transducer is driven. More particularly, the heat which is developed at and in the vicinity of the voice coil is sufficiently high that the vibratory structure (i.e., the diaphragm, membrane or bobbin) should be formed of materials that can withstand high temperatures. For example, if the voice coil is wound upon a bobbin, the bobbin may be deformed at the high operating temperature of the transducer, thereby creating the possibility that the voice coil may slip, which could damage or destroy the transducer. Even if the voice coil does not slip from the bobbin, deformation of the latter may result in undesired contact between the bobbin and the magnetic circuit of the transducer, which also could damage the transducer. Still further, by reason of the deformation of the bobbin, the voice coil may not uniformly traverse the magnetic flux in the magnetic circuit. This non-uniformity may result in undesired distortion of the sound (or sound signal) which is produced. Thus, it is important that the vibratory structure be formed of sufficiently heat-resistant material.

One type of material that is light weight and heat resistant is the polyimide film. If a polyimide film is used in the construction of the vibratory structure, such as the membrane, diaphragm or bobbin of an electro-acoustic transducer, the aforenoted desirable properties may be attained, while avoiding undesired temperature-dependent characteristics. However, heretofore, the voice coil has been mechanically coupled to the polyimide film by an adhesive. For example, in a so-called ribbon-type speaker in which the voice coil is coupled to the diaphragm, or in a speaker in which the voice coil is wound upon the bobbin, if the diaphragm or bobbin is formed of material which includes the polyimide film, the voice coil is adhesively coupled to that film. The high operating temperatures which are developed during operation of the transducer weakens or even breaks the adhesive coupling such that the voice coil may separate from the diaphragm or bobbin. This is attributed, primarily, to the generally poor temperature characteristics of typical adhesives which are needed to couple the voice coil to the vibratory structure.

OBJECTS OF THE INVENTION

Therefore, it is an object of the present invention to provide an improved electro-acoustic transducer which exhibits the desirable properties described above, yet avoids the disadvantages of prior art transducers.

Another object of this invention is to provide an electro-acoustic transducer having a vibratory structure of novel construction.

A further object of this invention is to provide an electro-acoustic transducer having a vibratory structure with a high Young's modulus and a low quality factor.

An additional object of this invention is to provide an electro-acoustic transducer in which a voice coil is coupled to a vibratory structure, the coupling therebetween being sufficient to withstand high operating temperatures of the transducer.

Yet another object of this invention is to provide an electro-acoustic transducer having a vibratory structure that is sufficiently heat-resistant, and in which a voice coil is non-adhesively coupled to the vibratory structure.

A still further object of this invention is to provide an electro-acoustic transducer having an improved vibratory structure that is light weight and heat-resistant.

Various other objects, advantages and features of the present invention will become readily apparent from the ensuing detailed description, and the novel features will be particularly pointed out in the appended claims.

SUMMARY OF THE INVENTION

In accordance with this invention, an electro-acoustic transducer is provided with a magnetic circuit having at least one air gap, a voice coil disposed in the air gap, and a vibratory structure mechanically coupled to the voice coil. The vibratory structure is comprised of a heat resistant film containing an epoxide-modified resin in which a heterocyclic compound containing a polyimide group is the main component. In accordance with one aspect of this invention, the voice coil is non-adhesively coupled to the vibratory structure. In one embodiment, the vibratory structure is a diaphragm, and the voice coil is provided as a conductive substrate of the diaphragm from which portions have been etched to form a generally spiral-shaped conductor. In another embodiment, the vibratory structure is a bobbin, and the voice coil is formed as a conductive surface of the bobbin from which portions have been etched to form a spiral-shaped conductor.

BRIEF DESCRIPTION OF THE DRAWINGS

The following detailed description, given by way of example, will best be understood in conjunction with the accompanying drawings in which:

FIG. 5 is useful in understanding how the vibratory structure of the present invention is formed;

FIG. 6 is a sectional view of another embodiment of the electro-acoustic transducer in accordance with the present invention; and FIG. 7 is a perspective view of an embodiment of a voice coil wound upon a bobbin which can be used in an electro-acoustic transducer in accordance with the present invention.

DETAILED DESCRIPTION OF CERTAIN PREFERRED EMBODIMENTS

Figure 1:
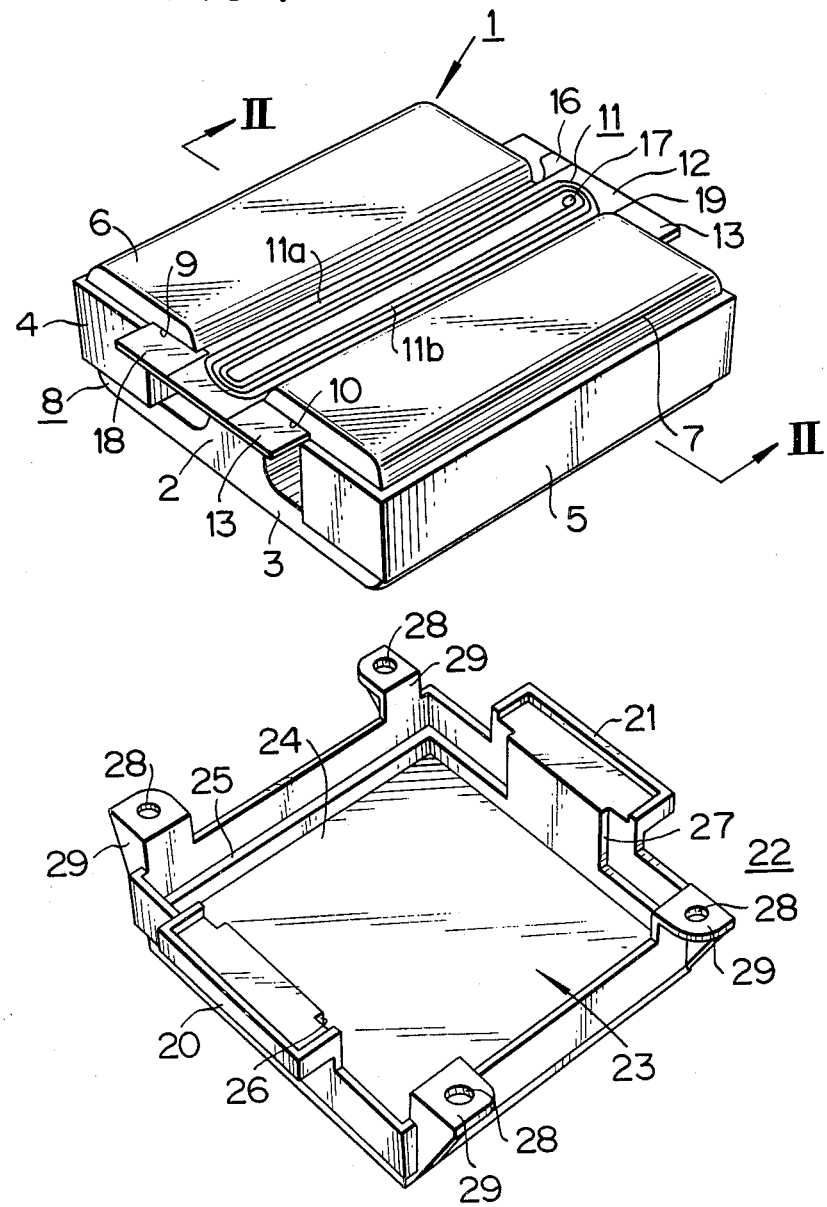
FIG. 1 is an exploded perspective view of one embodiment of the electro-acoustic transducer in accordance with the present invention.
Figure 2:
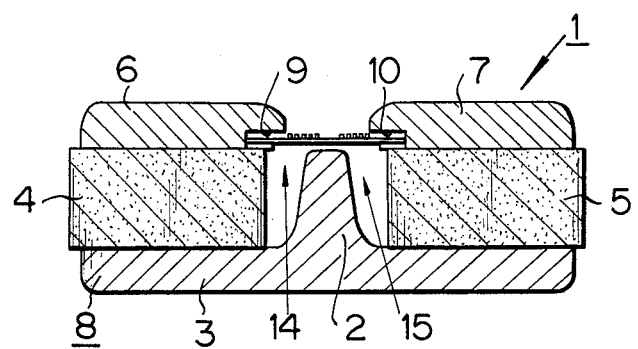
FIG. 2 is a sectional view taken along lines II—II of FIG. 1.
Figure 3:
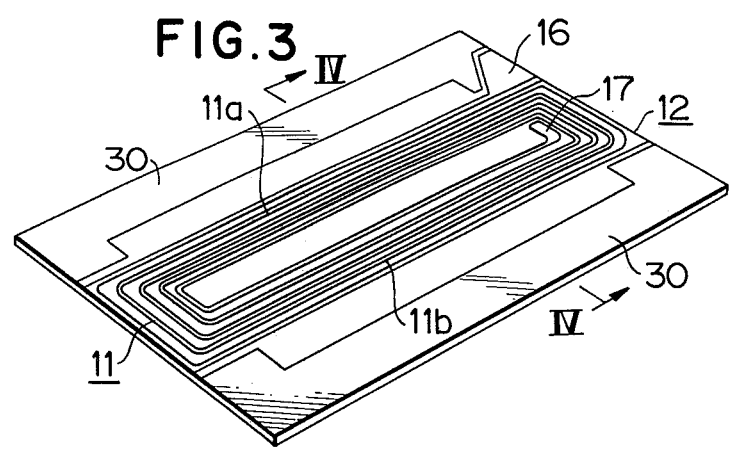
FIG. 3 is an enlarged perspective view of the vibratory structure which is used in the embodiment shown in FIG. 1.
Figure 4:
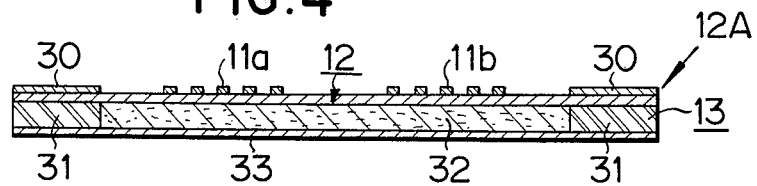
FIG. 4 is an enlarged sectional view taken along lines IV—IV of FIG. 3.

Referring now to the drawings, one embodiment of a so-called ribbon-type electro-acoustic transducer which incorporates the present invention is illustrated in FIGS. 1-4. FIG. 1 is a perspective view of this transducer, including the housing, or enclosure therefor; FIG. 2 is a sectional view of the transducer; and FIGS. 3 and 4 illustrate the diaphragm which is used as the vibratory structure in this transducer. For the purpose of the present description, it will be assumed that the illustrated transducer is a loudspeaker; however it should be readily apparent that the transducer can be a microphone, if desired.

Speaker 1 is substantially rectangular, when viewed from above, and may even be square-shaped. The speaker includes a magnetic circuit 8 which includes a yoke 3 having a center pole 2 which runs substantially the entire length of the yoke, a source of magnetic flux formed of, for example, permanent magnets 4 and 5, and plate-like members 6 and 7. Magnets 4 and 5 are disposed upon yoke 3, and are positioned on either side of center pole 2. These magnets may comprise, for example, rectangular-shaped bar magnets. Plate-like members 6 and 7 are positioned on top of magnets 4 and 5, and are spaced from center pole 2 so as to create air gaps 14 and 15 between plate-like members 6 and 7 and the center pole, respectively. Yoke 3 and the plate-like members may be constructed of magnetically permeable material. It is appreciated that magnetic flux traverses air gaps 14 and 15 between plate-like member 6 and center pole 2, and between plate-like member 7 and the center pole.

A notched portion, or slit, 9, is provided longitudinally of plate-like member 6 in the vicinity opposite center pole 2. A similar notched portion, or slit, 10 is provided longitudinally in plate-like member 7. Notched portions 9 and 10 are opposite each other and are adapted to receive the vibratory structure which, in the illustrated embodiment, is a vibratory diaphragm 12. More particularly, and as shown in FIG. 4, diaphragm 12, which will be described in greater detail below, is supported on a frame 13 having longitudinally extending support members 31 at opposite edges of diaphragm 12. Frame 13 is inserted into notched portions 9 and 10, as shown in FIG. 2. Thus, diaphragm 12 effectively is sandwiched between frame 13 at the lower surface thereof and the notched portions 9 and 10 of plate-like members 6 and 7, respectively.

A generally spiral-shaped current conductor 11 is mechanically coupled to the upper surface of diaphragm 12. As will be described in greater detail below, the current conductor is non-adhesively coupled to the diaphragm, and forms a voice coil having longitudinally extending conductors 11a and 11b as shown in FIG. 3. Terminals 16 and 17 are provided at opposite ends of the spiral-shaped voice coil for electrically connecting the voice coil to a suitable driving circuit for the embodiment wherein the illustrated transducer is used as a speaker. Thus, current may flow from such driving circuit through voice coil 11.

When assembled, air gaps 14 and 15 are symmetrical with respect to center pole 2, and diaphragm 12 is received in notched portions 9 and 10 of plate-like members 6 and 7 so as to dispose voice coil 11 symmetrically with respect to these air gaps. Longitudinally extending conductors 11a and 11b are substantially perpendicular to the magnetic flux which traverses air gaps 14 and 15 between plate-like members 6, 7 and center pole 2. Alternatively, the magnetic flux may intercept conductors 11a and 11b at any desired, oblique angle. When the transducer is operated as a speaker, current is supplied to voice coil 11, whereby an upwardly or downwardly directed force is exerted on longitudinally extending conductors 11a and 11b by reason of the combination of the currents therethrough and the traversing magnetic flux. This force is, of course, a function of the magnitude, polarity and frequency of the current. As a consequence thereof, voice coil 11 tends to move, or vibrate. Since the voice coil is mechanically coupled to diaphragm 12, it is appreciated that the diaphragm undergoes a corresponding vibration. That is, movement of voice coil 11 is translated into movement of diaphragm 12. This movement of the diaphragm generates sound waves which can be perceived. Of course, if the illustrated transducer is used as a microphone, sound waves impinge upon diaphragm 12 to set it in motion. This, in turn, moves voice coil 11 through the magnetic flux which traverses air gaps 14 and 15. An electrical current is induced in the voice coil by reason of the movement thereof in the presence of magnetic flux. This induced current is supplied to further electrical circuitry (not shown) via terminals 16 and 17.

The lower portion of FIG. 1 illustrates a housing, or support assembly 22, for speaker 1. The overall shape of housing 22 is similar to that of the speaker so as to receive and support the various elements of the speaker. As an example, housing 22 may be molded of synthetic resin. The housing is provided with support tables 20 and 21 for supporting the opposite end projections 18 and 19 of diaphragm 12, which projections extend beyond yoke 3 and protrude from magnetic circuit 8.

Housing 22 includes a bottom wall 23 adapted to receive and support magnetic yoke 3. A step portion, or ledge, 25 is provided as a peripheral ledge raised upwardly from surface 24 of bottom wall 23. Ledge 25 is adapted to receive and support magnets 4 and 5 which are mounted upon yoke 3 of speaker 1. In addition, walls 26 and 27 extend upwardly from ledge 25 at support tables 20 and 21 to be fitted between magnets 4 and 5, thereby locating the magnets in proper, symmetrical position in the assembled speaker. Still further, mounting brackets 29 extend upwardly from the corners of housing 22, these mounting brackets being provided with mounting holes 28, which may be threaded, so as to secure the assembled speaker to a suitable support structure box, or the like.

The vibratory structure upon which voice coil 11 is provided, that is, diaphragm 12, is formed from a heat-resistant film comprising an epoxide-modified resin in which a heterocyclic compound containing a polyimide group is the main component. The resin is obtained by the reaction of epoxide resin with the heterocyclic compound containing the polyimide group.

The reaction of the epoxide resin with the heterocyclic compound containing polyimide groups is shown in the following equation:

imide, polyamide-imide, polyester imide, polyester amide imide, polyimideazapyrrolon, polyparabanic-acid-imide or copolymes of such groups. It is preferable to employ resins having a molecular weight of 5,000 or more and "n" of the above equation is defined accordingly. While a polymer having a molecular weight of 5,000 or more is preferred, there is no specific limit to the molecular weight. The higher molecular weight resins have advantageous film-forming properties and films prepared from such resins are superior in mechanical strength.

The epoxide-modifying resin is a reactive polyepoxide or polyglycidyl compound containing at least two epoxide radicals in each molecule. Suitable compounds are diglycidyl ethers derived from bisphenols or halogenated bisphenols; glycidyl ethers derived from cycloaliphatic polyepoxy compounds, novolak resins, polyphenol or polyhydroxyphenol; glycidyl ethers or esters derived from aromatic oxycarboxylic acids or aromatic carboxylic acids; glycidyl esters of dimeric acids; glycidyl ethers of polyalkylene glycols; or rubber- or urethane-modified resins of such compounds. These compounds may be used either alone or in mixtures of two or more compounds. A small amount of monoepoxide compound of low molecular weight may be used together with the reactive polyepoxide or polyglycidyl compound.

The reactive polyepoxide or polyglycidyl compound

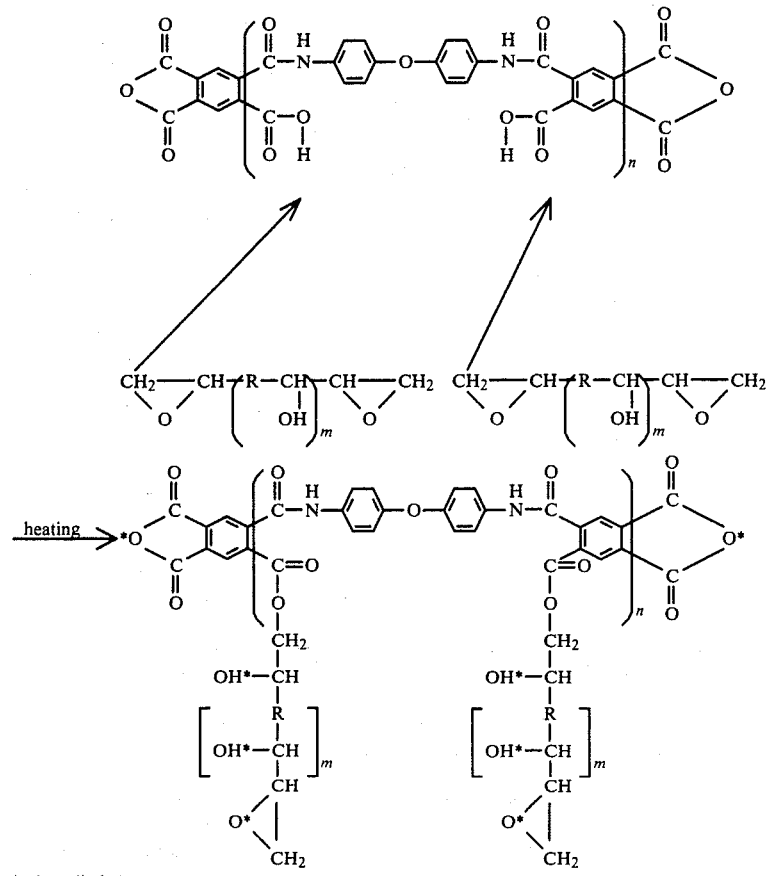

*polar radical group

The resin thus obtained is heated. It then may be set as shown in FIG. 5.

The heterocyclic compound containing polyimide groups is selected from compounds containing polypreferably has a molecular weight of 800 or more. Resins having a molecular weight of 800 or more have advantageous film-forming properties. Particularly, films formed from polyepoxide resins having a molecular weight of 800 or more have superior tensile strength. Films formed from polyepoxide resins having a molecular weight of less than 800 are so fragile that satisfactory diaphragms will not be formed.

Desirably, the two resin components are employed in from 0.1 to 30 parts by weight of polyepoxide resin to 100 parts by weight of polyimide resin. Preferably, 1 to 15 parts by weight of polyepoxide resin are employed per 100 parts by weight of polyimide resin.

The two resin components are preferably mixed and heated and agitated at a temperature of from 15° C. to 150° C. for 30 minutes to 10 hours before they are cast on a metal foil during the film formation step, as further described below. The resins formed according to such procedures have superior film-forming properties and have sufficient mechanical strength to form diaphragms.

The heat-resistant film is produced from such resin compositions by a solution casting process. The resin composition is dissolved in a suitable organic solution, which may be, for example, dimethylacetamid, dimethylformamide, dimethylsulfoxide, N-methylpyrrolidone, γ-butyrolactone, caprolactone, pyridine, piperidine, phenol, cresol, dichloromethane, dioxane, tetrahydrofuran, toluene, xylene, solventnaptha, a ketone, an alcohol group or mixtures thereof.

The solution, having a concentration of 5 to 70% by weight, is applied to the surface of a conductive metal foil which is processed to form the voice coil, for example by painting thereon, in a uniform thickness of from 0.5–300μ. The metal foil is then dried at a temperature of 50° to 450° C. in a dryer or, if necessary, it is dried in two or more stages for two minutes to 25 hours to form the resin film coating. The solution may be applied to the foil by use of a suitable coating tool, by a doctor blade, a flow coater, etc. Drying of the coated foil may be by infrared treatment, steam drying, high frequency techniques, or a combination of the foregoing.

Specific examples of the composite laminated film of heat resisting resin film and metal foil used in the present invention are shown in the following examples.

EXAMPLE I 100 parts by weight of a polyimide resin (molecular weight: 9,000) obtained by polycondensing 2 moles of pyromellitic anhydride and 1 mole of diaminodiphenylmethane in N-methylpyrrolidone was reacted at 100° C. for 3 hours with 10 parts by weight of a bisphenol A type epoxide resin (molecular weight: 2,100) obtained by reacting 1 mole of bisphenol A and 1 mole of propylasizoxide using caustic potash as catalyst. A heat-resistant resin with an intrinsic viscosity of 1.7 at 25° C. was obtained. This resin was dissolved in N-methylpyrrolidone and diluted to a concentration of 25 percent by weight, and the solution was coated on a 20 micron-thick aluminum foil to a coating thickness of about 15 microns by means of a flow coater. The coating was dried for 30 minutes at 250° C., to form a film. Thus, a composite laminated film was obtained.

EXAMPLE II 100 parts by weight of a polyamide-imide resin (molecular weight: 30,000) obtained by addition-polymerizing 1 mole of trimellitic anhydride and 1 mole of diphenylmethane diisocyanate in N-methylpyrrolidone was reacted at 80° C. for one hour with 8 parts by weight of a bisphenol A type epoxide resin (molecular weight: 1,000) obtained by reacting 1 mole of bisphenol A and 1 mole of ethylene oxide using caustic potash as catalyst, and was additionally reacted at 150° C. for one hour. A heat-resistant resin was obtained leaving an intrinsic viscosity of 1.6 at 25° C. This resin was diluted with a mixed solvent of 5 parts by weight of N-methylpyrrolidone and 1 part by weight of xylene to a concentration of 20 percent by weight and coated on a 20 micron-thick aluminum foil to a coating thickness of about 10 microns by means of a flowcoater. The coating was then dried at 150° C. for 10 minutes and then dried at 220° C. for 60 minutes to form a film. Thus, a composite laminated film was obtained.

EXAMPLE III 100 parts by weight of a polyesterimide (molecular weight: 15,000), obtained by reacting 1 mole of diaminophenylether with an adduct obtained by reacting 1 mole of trimellitic anhydride, 0.2 mole pyromellitic anhydride and 1 mole of hydroquinone diacetate in cresol, was mixed with 20 parts by weight of a brominated bisphenol A type resin (molecular weight: 1,800) obtained by reacting 1 mole of brominated bisphenol A and 1 mole of ethylene oxide using caustic potash as a catalyst. A resin was obtained with an intrinsic viscosity of 1.9 at 25° C. This resin was diluted with cresol to a concentration of 40 percent by weight and coated on a 30 micron-thick copper foil to a coating thickness of about 30 microns by means of a flowcoater. The coating was dried at 150° C. for one hour, and further dried in an atmosphere of nitrogen gas at 280° C. for two hours to form a film. Thus, a composite laminated film was obtained.

EXAMPLE IV 100 parts by weight of a polyaminobismaleimide (molecular weight: 8,000) was reacted with 20 parts by weight of an epoxide resin, as obtained in Example I, in N-methylpyrrolidone at 80° C. for 3 hours, to obtain a resin with an intrinsic viscosity of 1.5 at 25° C. This resin was diluted with N-methylpyrrolidone to a concentration of 40 percent by weight and coated on a 15 micron-thick titanium foil to a coating thickness of about 20 microns. The coating then was dried at 230° for 10 hours to form a film. Thus, a composite laminated film was obtained.

The vibratory structure made by the procedures of Examples I–IV have good acoustic characteristics and also have excellent heat resistance when using an electro-acoustic transducer. These examples are illustrative of the method of making composite laminated films to be used for transducers but the invention is not limited thereby.

Voice coil 11 is formed by etching away suitable portions of the metal foil after the latter is coated with the aforementioned solution. The instant specification refers, interchangeably, to the foil coated with the epoxide-modified resin, or the resin coated with the foil. In either case, the foil should have acceptable electrical conductivity and should be capable of being etched. Such foils may be copper, aluminum, nickelchrome, nickel, titanium or the like. The thickness of the foil preferably is on the order of 1 to 150 microns. In order to improve the characteristics thereof, the metal foil may be subjected to surface plating thereof with gold, nickel, a solder compound or the like. Furthermore, since adhesives are not used to couple the resin film to the foil, adhesion therebetween may be improved by roughening the surface of the foil, as by mechanical grinding, chemical etching using chromic acid-sulfuric acid, or other conventional roughening techniques.

Thus, a composite laminate is obtained having one layer formed of the aforementioned heat-resistant resin film coated onto the metal foil layer. Voice coil 11 is formed by etching portions of the metal foil layer thereby leaving the generally spiral-shaped current conductor, as shown in FIGS. 1 and 3. Preferably, the etching the metal foil does not remove side portions 30. These side portions are not electrically connected to voice coil 11, but, nevertheless, remain as marginal portions on diaphragm 12. Such marginal portions 30 serve to reinforce the diaphragm, particularly when the laminate structure is cut, or otherwise formed, into the illustrated predetermined shape having specific dimensions. In the absence of portions 30, diaphragm 12 would be tensioned when mounting onto frame 13. By reason of this tensioning, the resin film would be elongated, flexed or partially stressed so as to make it difficult to align the diaphragm, and particularly voice coil 11, with the magnetic circuit. Such misalignment may result in non-uniform flux traversing the voice coil which, in turn, may distort the sound which is reproduced by this structure. This difficulty is avoided by providing the substantially rigid portions 30 along the sides of diaphragm 12. Consequently, the diaphragm may be positioned and located accurately on frame 13 and, additionally, voice coil 11 is in alignment with the magnetic circuit.

As shown more clearly in FIG. 4, diaphragm 12, having voice coil 11 etched thereon so as to form a so-called diaphragm block 12A, is mounted on frame 13. Preferably, a sound-absorbing material 32 fills the frame beneath the lower surface of the diaphragm so as to provide additional support therefor. A resin film 33 then is mounted to the bottom portion of frame 13 so as to combine with diaphragm block 12A to sandwich the sound absorbing material therebetween. Although the use of sound absorbing material is preferable, it is optional and may, if desired, be omitted.

As described above, the resin composition which is used to form diaphragm 12 is obtained by reacting the epoxide resin with the heat resistant resin of polyimide which, as shown in the above reaction formula, greatly increases the polar radicals. By using the epoxide resin to react with the heat resistant polyimide resin, the resultant resin composition adheres strongly to the film of metal foil; such adhesion being far greater than could be obtained if the heat resistant resin was used alone. Because of the good adhesive qualities,, voice coil 11 is not-adhesively secured to the vibratory structure. That is, and as used throughout this specification, no adhesives are needed to mechanically couple the voice coil to the vibratory structure. In the absence of such adhesives, the prior art problem of peeling or slippage of the voice coil caused by high operating temperature degradation of the adhesive which heretofore has been used, is avoided. Thus, the heat resistant property of the vibratory structure is improved, both during high operating temperatures of the transducer, and also during soldering of conductive wires to the voice coil. This improves the workability of diaphragm 12.

The resin composition which is formed by reacting the epoxide resin with the heat resistant resin of polyimide has three dimensional cross-linking. Because of this, contractions due to setting, which would result if a linear polymer alone were used, is suppressed. The growth of wrinkles, curls and other disturbances in the resultant resin composition is negligible. Thus, diaphragm 12 can be formed with precise dimensions. In particular, the pattern of voice coil 11 which is etched upon the diaphragm is highly accurate, resulting in establishing a predetermined impedance within relatively precise tolerances.

The resin viscosity of the resin composition which is formed by reacting the epoxide resin with the heat resistant resin of polyimide can be reduced by using an epoxide resin whose molecular weight is relatively low in comparison to that of the heat resistant polyimide resin. More particularly, the viscosity of the resultant resin composition can be determined merely by selecting an appropriate epoxide resin for reaction. This also is determinative of the quality factor Q of the vibratory structure. If a heat resistant polyimide resin is used alone, the Q factor is on the order of about 100 to 120. But when the epoxide resin reacts with the heat resistant polyimide resin to form the epoxide-modified resin film used in the present invention, the quality factor is reduced to about 50 to 80. Notwithstanding the reduction in the resin viscosity and quality factor, Young's modules E is maintained at substantially the same degree as if the heat resistant resin film had been used by itself. Thus, the epoxide-modified resin which comprises the heat resistant film used in the vibratory structure of the present invention exhibits desirable properties for a diaphragm (i.e., a high Young's modulus and a low quality factor) particularly adapted for a diaphragm in an electro-acoustic transducer. By reducing the viscosity of the resin composition, that is, by using an epoxide resin of low molecular weight, the resin composition can be stretched onto the metal foil such that the surface of the resin composition is uniform. This improves the nature of the film, and insures a uniform thickness throughout. Also, the three dimensional cross-linking of the resin composition provides a film with high mechanical strength. Therefore, diaphragm 12 is thin, light and strong.

Another embodiment of an electro-acoustic transducer in accordance with the present invention is illustrated in FIG. 6, wherein a diaphragm 42, which is formed of the aforedescribed resin composition, is coupled to a frame 40 and, additionally, to a bobbin 47 having a voice coil 46 wound about a portion thereof. The transducer is adapted to function as a speaker 100 and includes a magnetic circuit 80 supported on bottom wall 40a of frame 40. The magnetic circuit includes a yoke 49 having a center pole 41 about which a ring-shaped permanent magnet 43 is provided so as to form an annular air gap 45. A plate-like member 44, which also may be ring-shaped, is formed of permeable material and is mounted upon the ring-shaped magnet. Voice coil 46, which is illustrated as being wound about the lower portion of bobbin 47, is disposed within air gap 45 of magnetic circuit 80 so as to be located within the magnetic flux which traverses the air gap and which is generated by magnet 43. The upper portion of bobbin 47 is coupled to diaphragm 40, which may be a flat plate-shaped diaphragm whose peripheral edge 42a is coupled to frame 40 by a packing 48. The combination of diaphragm 42, bobbin 47 and voice coil 46 functions as the vibratory structure. When used as a speaker, current through the voice coil interacts with the magnetic flux in air gap 45 to exert a force on the voice coil, and thus the bobbin, and plate-shaped diaphragm coupled thereto, resulting in a corresponding movement, or vibration of the diaphragm. This, in turn, generates sound.

In the embodiment shown in FIG. 6, a layer of metal foil, described previously with respect to the embodiment of FIGS. 1-4, which foil was used to form voice coil 11, now is not needed. Thus, after the resin composition is applied to the metal foil, the entire foil can be removed by etching. That is, the etching which resulted in voice coil 11 no longer is needed. Once the foil is etched away, diaphragm 42 may be cut to its desired shape.

Diaphragm 42 may be formed by applying the resin composition, in solvent, to a substrate having a satisfactory exfoliating property. Once applied to this substrate, the resin composition is dried. Subsequently, the resin composition is removed from the substrate by exfoliation, resulting only in the resin composition film. This film may be cut into desired shape to form the diaphragm.

In the embodiment of FIG. 6, as in the embodiment described above with respect to FIGS. 1-4, the diaphragm, as a vibratory structure, is thin, light weight, has relatively high mechanical strength, is heat resistant, has a relatively high Young's modulus and a relatively low quality factor Q.

Yet another embodiment of a voice coil which can be used in the electro-acoustic transducer of the present invention is illustrated in FIG. 7. In this embodiment, voice coil 51 is wound about bobbin 50, the latter being formed as the laminate of resin composition and etched electrical conductor, so as to form the vibratory structure. The resin composition may be coated onto the surface of a cylinder formed of metal foil, and then portions of this foil may be etched away so as to provide the generally spiral-shaped voice coil 51. Bobbin 50 thus is relatively thin, is of light weight, has a high mechanical strength and exhibits a desirable heat resistant property, particularly in the environment of the relatively high operating temperature of the transducer in which it is used. Thus, by forming the bobbin of an epoxide-modified resin as described above, it exhibits good acoustic characteristics without presenting an undesirable load to the diaphragm (not shown) to which it may be coupled.

Thus, it is seen that the electro-acoustic transducer of the present invention is provided with a vibratory structure whose material exhibits a high Young's modulus, low quality factor, is light weight, exhibits high mechanical strength and is desirably heat resistant. Such an electro-acoustic transducer is readily adapted to function either as a speaker, a head-phone, a microphone, or the like, which is provided with excellent acoustic characteristics. The desirable heat resistant property of this vibratory structure can stand an exothermic reaction which may be attributed to high power, whereby the transducer is provided with high reliability and good performance.

While the present invention has been particularly shown and described with reference to certain preferred embodiments thereof, it should be readily apparent to those of ordinary skill in the art that various changes and modifications in form and details may be made without departing from the spirit and scope of the invention. It is intended that the appended claims be interpreted as including all such changes and modifications.

What is claimed is:

1. An electro-acoustic transducer, comprising a magnetic circuit having at least one air gap; current conducting means disposed in the air gap of said magnetic circuit to form a voice coil, and a vibratory structure mechanically coupled to said voice coil, said vibratory structure being comprised of a heat resistant film containing an epoxide-modified resin in which a heterocyclic compound containing a polyimide group is the main component.

2. The transducer of claim 1 wherein said vibratory structure is a diaphragm.

3. The transducer of claim 2 wherein said voice coil comprises a conductive substrate of said diaphragm from which portions have been etched to form a generally spiral-shaped conductor.

4. The transducer of claim 2, further comprising a bobbin mechanically coupled to said diaphragm, said voice coil being wound about at least a portion of said bobbin.

5. The transducer of claim 4, further comprising support means for supporting said diaphragm at a peripheral portion thereof.

6. The transducer of claims 1, 2, 3, 4 or 5 wherein said magnetic circuit is comprised of a pair of magnetically permeable plate members, a center pole disposed between said plates to establish a pair of air gaps therebetween, a source of magnetic flux, said magnetic flux traversing said air gaps, and said current conducting means being disposed in said magnetic flux.

7. The transducer of claim 1, wherein said vibratory structure comprises a bobbin, said voice coil being wound about said bobbin.

8. The transducer of claim 7 wherein said voice coil comprises a conductive surface of said bobbin from which portions have been etched to form a spiral-shaped conductor.

9. The transducer of claim 1 wherein said voice coil comprises a conductive layer non-adhesively coated on said vibratory structure and from which portions have been removed to form a generally spiral-shaped conductor.

10. An electro-acoustic transducer, comprising a magnetic circuit having at least one air gap; current conducting means disposed in the air gap of said magnetic circuit to form a voice coil, and a vibratory structure mechanically coupled to said voice coil, said vibratory structure being comprised of a heat resistant film containing an expoxide-modified resin formed by the reaction of an epoxide resin with a heterocyclic compound containing a polyimide group, said heterocyclic compound being selected from the group consisting of polyamide, polyester imide, polyester amide imide, polyimideazopyrrolon, and polyperabanic-acid-imide.

11. The transducer of claim 10 wherein said epoxide resin is a reactive polyepoxide compound containing at least two epoxide radicals in each molecule.

12. The transducer of claim 10 wherein said epoxide resin is a reactive polyglycidyl compound containing at least two epoxide radicals in each molecule.

13. The transducer of claim 11 or 12 wherein said compound is selected from the group consisting of diglycidyl ethers derived from bisphenols or halogenated bisphenols, glycidyl ethers derived from cycloaliphatic polyepoxy compounds, novolak resins, polyphenol, polyhydroxyphenol, glycidyl ethers or esters derived from aromatic oxycarboxylic acids or aromatic carboxylic acids, glycidyl esters of dimeric acids, and glycidyl ethers of polyalkylene glycols.

14. An electro-acoustic transducer, comprising a magnetic circuit having at least one air gap; current conducting means disposed in the air gap of said magnetic circuit to form a voice coil, and a vibratory structure mechanically coupled to said voice coil, said vibratory structure being comprised of a heat resistant film containing an epoxide-modified resin formed by the reaction of an epoxide resin compound containing at least two epoxide radicals in each molecule with a polyimide resin having a molecular weight of at least 5,000.

15. The transducer of claim 14 wherein said epoxide-modified resin is comprised of 100 parts by weight of the polyimide resin and 1 to 15 parts by weight of the epoxide resin.

16. An electro-acoustic transducer comprising a magnetic circuit; a source of magnetic flux; an air gap in said magnetic circuit traversed by said magnetic flux; a diaphragm comprised of a heat resistant film containing an epoxide-modified resin in which a heterocyclic compound containing a polyimide group is the main component; a generally spiral-shaped current conductor non-adhesively secured to a surface of said diaphragm; and support means for supporting said diaphragm in said air gap such that said current conductor is disposed in said magnetic flux.

17. The transducer of claim 16 wherein said support means comprises support plate means formed of magnetically permeable material; and a frame coupled to said support plate means, said diaphragm being mounted on said frame.

18. An electro-acoustic transducer comprising a magnetic circuit; a source of magnetic flux; an air gap in said magnetic circuit traversed by said magnetic flux; a bobbin disposed in said air gap; a voice coil wound about said bobbin and traversed by said magnetic flux; and a diaphragm coupled to said bobbin to vibrate when an electrical current flows through said voice coil, said diaphragm being comprised of a heat resistant film containing an epoxide-modified resin in which a heterocyclic compound containing a polyimide group is the main component.

19. An electro-acoustic transducer comprising a magnetic circuit; a source of magnetic flux; an air gap in said magnetic circuit traversed by said magnetic flux; a bobbin disposed in said air gap comprised of a heat resistant film containing an epoxide-modified resin in which a heterocyclic compound containing a polyimide group is the main component; and a voice coil wound upon said bobbin and comprising a conductive coating on the surface of said bobbin from which portions have been etched away.

* * * * *